US010564040B2

(12) United States Patent
Gillis

(10) Patent No.: US 10,564,040 B2
(45) Date of Patent: Feb. 18, 2020

(54) METHOD AND APPARATUS FOR IDENTIFYING INFORMATION ABOUT SPATIALLY UNRESOLVED OBJECTS IN HYPERSPECTRAL IMAGES

(75) Inventor: James Ridgeway Gillis, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1562 days.

(21) Appl. No.: 13/206,188

(22) Filed: Aug. 9, 2011

(65) Prior Publication Data

US 2013/0041615 A1 Feb. 14, 2013

(51) Int. Cl.
*G01J 5/60* (2006.01)
(52) U.S. Cl.
CPC ...................... *G01J 5/60* (2013.01)
(58) Field of Classification Search
CPC .......... G06K 9/186; G01J 5/60; G06T 7/0044
See application file for complete search history.

(56) References Cited

U.S. PATENT DOCUMENTS

| 4,974,182 | A | * | 11/1990 | Tank | 702/135 |
| 6,282,301 | B1 | * | 8/2001 | Haskett | 382/103 |
| 7,200,243 | B2 | * | 4/2007 | Keenan et al. | 382/100 |
| 8,050,884 | B2 | | 11/2011 | Murata | |
| 2010/0256945 | A1 | | 10/2010 | Murata | |

FOREIGN PATENT DOCUMENTS

WO WO9927336 A1 6/1999

OTHER PUBLICATIONS

Shaw et al, "Signal Processing for Hyperspectral Image Exploitation", IEEE Signal Processing Magazine, pp. 12 to 16 (Jan. 2012).*
"Spatial/Spectral Endmember Extration by Multidimensional Morphological Operations", Plaza et al. (2002).*
UK search report dated Nov. 9, 2012 regarding application GB1213750.1, 5 pages.
Hornbeck, "Optical Methods of Temperature Measurement," Applied Optics, 1966, pp. 179-186, vol. 5, No. 2.
Barani et al., "Comparison of some algorithms commonly used in infrared pyrometry: a computer simulation," Thermosense XIII, 1991, pp. 458-468, SPIE vol. 1467.
Duvaut et al., "Multiwavelength infrared pyrometry: optimization and computer simulations," Infrared Physics & Technology 36, 1995, pp. 1089-1103.
Spitzberg, "Parameter estimation for gray and nongray targets: theory and data analysis," Optical Engineering, 1994, pp. 2418-2429, vol. 33, No. 7.
Penner, "Quantitative Molecular Spectroscopy and Gas Emissivities," 1959, pp. 455-465, Addison-Wesley Publishing Company, Inc., Reading.

* cited by examiner

*Primary Examiner* — Janet L Suglo
(74) *Attorney, Agent, or Firm* — Yee & Associates, P.C.

(57) ABSTRACT

A method and apparatus for identifying information about objects. Radiant intensity measurements for an object are identified from sensor data for a plurality of bands of electromagnetic radiation. The object has parts. A system of equations that includes the radiant intensity measurements is generated. The system of equations is solved to identify information about each part in the parts of the object.

18 Claims, 4 Drawing Sheets

METHOD AND APPARATUS FOR IDENTIFYING INFORMATION ABOUT SPATIALLY UNRESOLVED OBJECTS IN HYPERSPECTRAL IMAGES

BACKGROUND INFORMATION

1. Field

The present disclosure relates generally to identifying objects and, in particular, to identifying objects in images. Still more particularly, the present disclosure relates to a method and apparatus for identifying information about parts of spatially unresolved objects using hyperspectral radiant intensity measurements for the objects.

2. Background

Monitoring the presence of objects and/or tracking the movement of objects in an environment may be useful in performing various activities. Oftentimes, monitoring and tracking operations are performed using different types of sensor systems. These different types of sensor systems may include, for example, without limitation, camera systems, video camera systems, infrared imaging systems, radar systems, spectral imaging systems, hyperspectral sensor systems, multi-spectral sensor systems, and/or other suitable types of sensor systems.

As one example, camera systems may be used to monitor the movement of vehicles on roads and highways. As another example, radar imaging systems may be used to monitor the presence of aircraft within a particular portion of airspace to control the flow of air traffic.

However, in some cases, sensor systems may not provide enough information to allow an object that has been detected to be identified. As one illustrative example, an imaging system may be used to generate images for the launch of a spacecraft. The spacecraft may be a launch vehicle with boosters attached to the launch vehicle. Images may be generated by the imaging system as the launch vehicle launches and moves through the Earth's atmosphere into space.

As the launch vehicle moves further away, the number of pixels that represent the launch vehicle in the images generated may be reduced. As the number of pixels representing the launch vehicle is reduced, the spatial resolution needed to identify the object in the image as the launch vehicle also may be reduced. In other words, the images may not provide enough information to accurately identify the object in the image as the launch vehicle.

Therefore, it would be advantageous to have a method and apparatus that takes into account at least some of the issues discussed above, as well as possibly other issues.

SUMMARY

In one advantageous embodiment, a method is provided for identifying information about objects. Radiant intensity measurements for an object are identified from sensor data for a plurality of bands of electromagnetic radiation. The object has parts. A system of equations that includes the radiant intensity measurements is generated. The system of equations is solved to identify information about each part in the parts of the object.

In another advantageous embodiment, a method is provided for identifying information about objects. Radiant intensity measurements for an object are identified from sensor data for a plurality of bands of electromagnetic radiation. The object has parts. Associations between the radiant intensity measurements and emissivity areas for the parts of the object are generated. Information about each part in the parts of the object is identified using the associations between the radiant intensity measurements and the emissivity areas for the parts of the object.

In yet another advantageous embodiment, a method is provided for identifying information about objects. Radiant intensity measurements for an object are identified from sensor data for a plurality of bands of electromagnetic radiation. The object has parts. The sensor data is received from a hyperspectral sensor system. A system of equations is generated. Each equation in the system of equations defines a radiant intensity measurement for a band in the plurality of bands using an emissivity area for each of the parts of the object and a Planck black body function for each of the parts. The Planck black body function for a part in the parts is integrated over the band at a temperature for the part. The system of equations is solved to identify the emissivity area and the temperature for each part in the parts of the object.

In still yet another advantageous embodiment, an apparatus comprises a computer system. The computer system is configured to identify radiant intensity measurements for an object from sensor data for a plurality of bands of electromagnetic radiation. The object has parts. The computer system is configured to generate a system of equations that includes the radiant intensity measurements. The computer system is configured to solve the system of equations to identify information about each part in the parts of the object.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
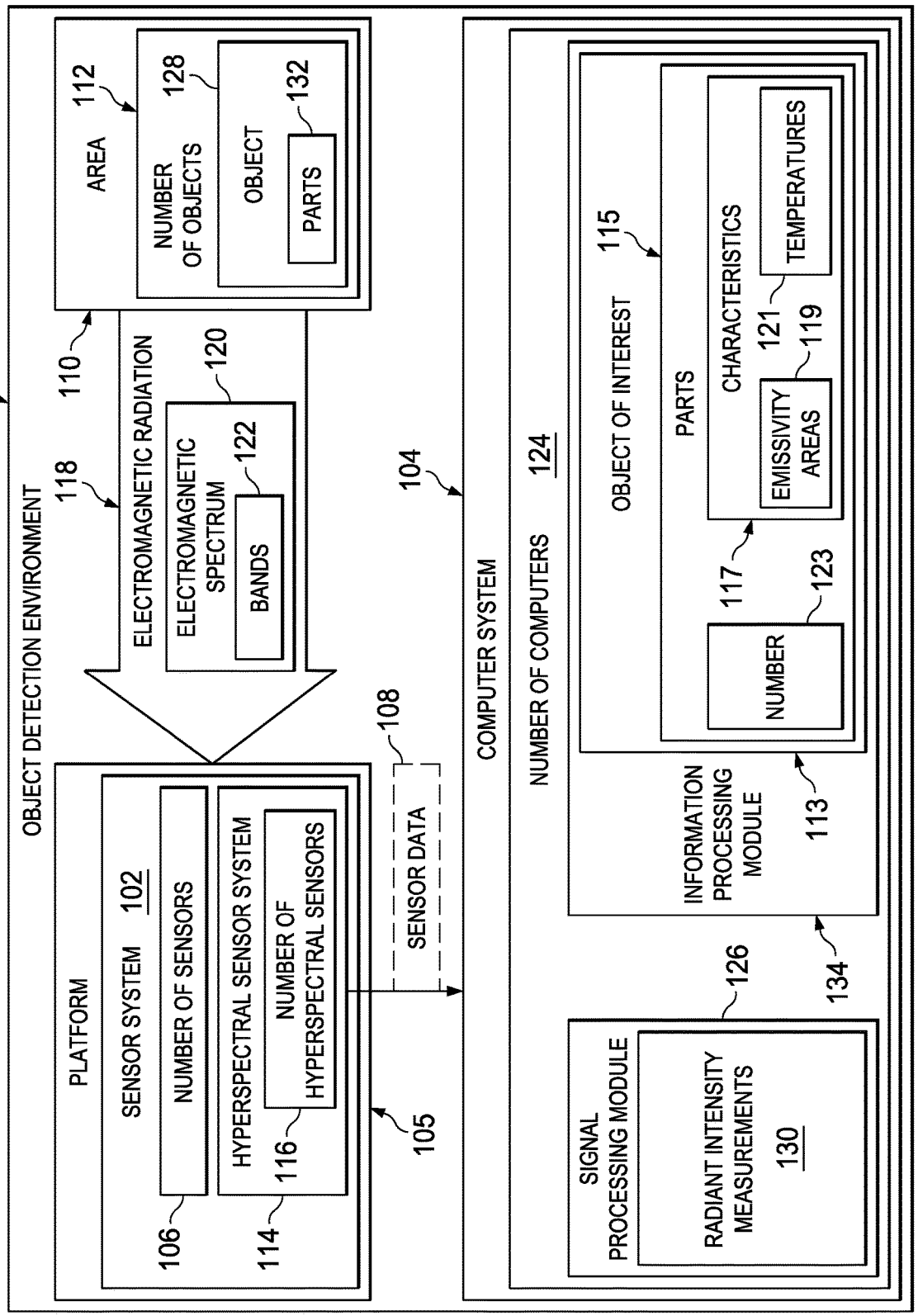
FIG. 1 is an illustration of an object detection environment in accordance with an advantageous embodiment.

The different advantageous embodiments recognize and take into account one or more different considerations. For example, the different advantageous embodiments recognize and take into account that with some currently-available sensor systems for monitoring and tracking objects, the objects that are located far away from the sensor systems may not be identifiable. For example, images generated by an imaging system may not provide the spatial resolution needed to identify objects detected in the images when the objects are located far away from the sensor imaging system. These objects may be referred to as spatially unresolved objects or unresolved objects detected in the images.

The different advantageous embodiments recognize and take into account that currently-available infrared radiometry systems may only allow a single temperature and a single emissivity area for an unresolved object to be identified. An emissivity area is a substitute for a projected area for the object that has been scaled using an emissivity for the object.

The projected area for the object is a two-dimensional area measurement of the object defined by projecting the shape of the object onto an arbitrary plane. In particular, the projected object is the two-dimensional area of the shape of the object from the viewpoint of the sensor system. The emissivity of the object is a measure of the ability of a surface of the object to emit energy in the form of electromagnetic radiation relative to the ability of a black body to emit energy in the form of electromagnetic radiation at the same temperature. A black body is an idealized physical body that absorbs substantially all incident electromagnetic radiation.

The temperature and emissivity area identified using currently-available infrared radiometry systems may be, for example, an average temperature and an average emissivity area for the object. The different advantageous embodiments recognize and take into account, however, that many objects do not have a substantially uniform temperature.

For example, an automobile that has been driven for a period of time may have parts that have different temperatures. In particular, the hood of a first automobile after the first automobile has just parked may be at a higher temperature than the trunk and roof of the first automobile. Further, a second automobile that has been parked for a longer period of time in the sun than the first automobile may have a substantially uniform temperature for the different parts of the automobile.

The different advantageous embodiments recognize and take into account that currently-used infrared radiometry systems that are configured to measure the radiant intensity emitted from these two automobiles may determine that these two automobiles have a single temperature and a single emissivity area. In other words, these systems may be unable to provide information about the different parts of these automobiles and may be unable to distinguish between these two automobiles.

The different advantageous embodiments recognize and take into account that it may be desirable to have a sensor system that allows the temperatures and emissivity areas of the different parts of an object to be identified. This additional information may then be used to distinguish between different objects.

Thus, the different advantageous embodiments provide a method and apparatus for identifying information about objects. In one advantageous embodiment, radiant intensity measurements for an object are identified from sensor data for a plurality of bands of electromagnetic radiation. The object has parts. A system of equations that includes the radiant intensity measurements is generated. The system of equations is solved to identify information about a part in the parts of the object.

With reference now to the figures and, in particular, with reference to FIG. 1, an illustration of an object detection environment is depicted in accordance with an advantageous embodiment. In this illustrative example, object detection environment 100 includes sensor system 102 and computer system 104. As depicted, sensor system 102 and computer system 104 are in communication with each other.

In this depicted example, sensor system 102 may be located on platform 105. Platform 105 may be selected from one of, for example, a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, and/or some other suitable type of platform.

As depicted, sensor system 102 may include number of sensors 106. Number of sensors 106 is configured to generate sensor data 108. More specifically, sensor data 108 may be generated for area 110 in object detection environment 100. Area 110 may include, for example, at least one of an area on ground, an area in air, an area on water, an area under water, and/or an area in space.

As used herein, the phrase "at least one of", when used with a list of items, means different combinations of one or more of the listed items may be used, and only one of each item in the list may be needed. For example, "at least one of item A, item B, and item C" may include, for example, without limitation, item A, or item A and item B. This example also may include item A, item B, and item C, or item B and item C.

As depicted, number of objects 112 may be present in area 110. As used herein, "a number of items" means one or more items. For example, "a number of objects" means one or more objects.

In one illustrative example, sensor system 102 may be located on platform 105 in the form of an unmanned aerial vehicle. Sensor system 102 may be used to generate sensor data 108 for area 110 and/or other areas over which the unmanned aerial vehicle flies.

Sensor data 108 generated by sensor system 102 may be used to detect number of objects 112 in area 110. Further, sensor data 108 may be used to determine whether any of number of objects 112 is an object of interest. For example, sensor data 108 may be used to detect object 128 in number of objects 112 and determine whether object 128 is object of interest 113.

Object of interest 113 may be, for example, an object moving in area 110, an object that poses a threat, an object exhibiting some type of behavior that warrants further monitoring, an object having parts with particular temperatures for those parts, or some other suitable type of object.

The parameters that define object of interest 113 may be selected based on, for example, user input. In these illustrative examples, object of interest 113 may be defined as having parts 115 with characteristics 117. Characteristics 117, in these illustrative examples, may include emissivity areas 119 and temperatures 121.

In particular, object of interest 113 may have parts 115 in which each of parts 115 has different values for characteristics 117. In other words, each part in parts 115 of object of interest 113 may have values for emissivity areas 119 and/or temperatures 121 that are different from the values for emissivity areas 119 and/or temperatures 121, respectively, for other parts in parts 115.

In these illustrative examples, object of interest 113 may take the form of, for example, an aircraft, an unmanned aerial vehicle, an automobile, a missile, a spacecraft, a space shuttle, or some other suitable type of object. As one illustrative example, object of interest 113 may be a car that has been parked in a particular location for a longer time than desired. As another illustrative example, object of interest 113 may be an airborne projectile that poses a threat.

In these illustrative examples, sensor system 102 may take the form of hyperspectral sensor system 114. When sensor system 102 is hyperspectral sensor system 114, number of sensors 106 takes the form of number of hyperspectral sensors 116.

Number of hyperspectral sensors 116 may detect electromagnetic radiation 118 that may be emitted by various materials in area 110. Further, number of hyperspectral sensors 116 may be capable of detecting electromagnetic radiation 118 across part or all of electromagnetic spectrum 120. In these illustrative examples, electromagnetic spectrum 120 is the range of all possible wavelengths of electromagnetic radiation 118. Of course, in other illustrative examples, electromagnetic spectrum 120 may be defined as the range of all possible frequencies of electromagnetic radiation 118.

As depicted, hyperspectral sensor system 114 is configured to generate sensor data 108 for bands 122 of electromagnetic radiation 118. Each of bands 122 of electromagnetic radiation 118 is a substantially contiguous range of wavelengths in electromagnetic spectrum 120. Further, in these illustrative examples, bands 122 may be contiguous ranges of wavelengths of electromagnetic radiation 118. However, in other illustrative examples, bands 122 may be discontiguous ranges of wavelengths of electromagnetic radiation 118.

In these illustrative examples, a total number of bands 122 selected for generating sensor data 108 may be based on a total number of parts 115 assumed to be present in object of interest 113. For example, an assumption may be made that object of interest 113 has number 123 of parts 115. Number 123 may be, for example, two, three, four, or some other suitable number of parts greater than one. The total number of bands 122 is selected as at least twice number 123 of parts 115 assumed to be present in object of interest 113. When sensor system 102 generates sensor data 108 for a total number of bands 122 that is selected as at least twice number 123 of parts 115 assumed to be present in object of interest 113, sensor system 102 takes the form of hyperspectral sensor system 114.

In these illustrative examples, hyperspectral sensor system 114 sends sensor data 108 for bands 122 to computer system 104 for processing. Computer system 104 takes the form of number of computers 124. When more than one computer is present in number of computers 124, these computers may be in communication with each other.

Number of computers 124 may be located in one or more locations. As one illustrative example, number of computers 124 may be located remote to hyperspectral sensor system 114 in these examples. In some cases, at least a portion of number of computers 124 may be part of hyperspectral sensor system 114. For example, one of number of computers 124 may be a processor unit in hyperspectral sensor system 114.

In these illustrative examples, signal processing module 126 is implemented in number of computers 124 in computer system 104. Signal processing module 126 may be implemented as hardware, software, or a combination of both.

Signal processing module 126 is configured to detect object 128 in number of objects 112 in area 110 using sensor data 108. Object 128 is assumed to have parts 132. In particular, object 128 is assumed to have a same number of parts 132 as number 123 of parts 115.

In these illustrative examples, sensor system 102 may be unable to provide sensor data 108 with the desired spatial resolution to determine whether object 128 is object of interest 113. In other words, sensor data 108 may not contain enough information to determine whether parts 132 of object 128 have substantially the same values for characteristics 117 as the values for characteristics 117 of parts 115 for object of interest 113. As a result, object 128 may be referred to as an unresolved object or a spatially unresolved object.

In response to signal processing module 126 detecting object 128, signal processing module 126 identifies radiant intensity measurements 130 in bands 122 for object 128 using sensor data 108. Radiant intensity measurements 130 may be used to determine whether object 128 is object of interest 113. In these illustrative examples, a radiant intensity measurement for object 128 is identified for each of bands 122 to form radiant intensity measurements 130.

A radiant intensity measurement is a measurement of the intensity of electromagnetic radiation 118 emitted by object 128 in one of bands 122. In particular, a radiant intensity measurement is a measurement of the intensity of electromagnetic radiation 118 emitted by object 128 that is within the range of wavelengths for a band in bands 122. In these illustrative examples, radiant intensity may be defined as power of electromagnetic radiation 118 per unit solid angle. For example, radiant intensity measurements 130 may have units of Watts per steradian (W/sr).

As depicted, signal processing module 126 is configured to send radiant intensity measurements 130 to information processing module 134. Information processing module 134 may be implemented using hardware, software, or a combination of both in computer system 104. In these illustrative examples, information processing module 134 and signal processing module 126 may be located on a same computer in number of computers 124 or in different locations.

In these illustrative examples, information processing module 134 uses radiant intensity measurements 130 to identify information about object 128 to determine whether object 128 is object of interest 113. This information may include, for example, emissivity areas and temperatures for parts of object 128.

Figure 2:
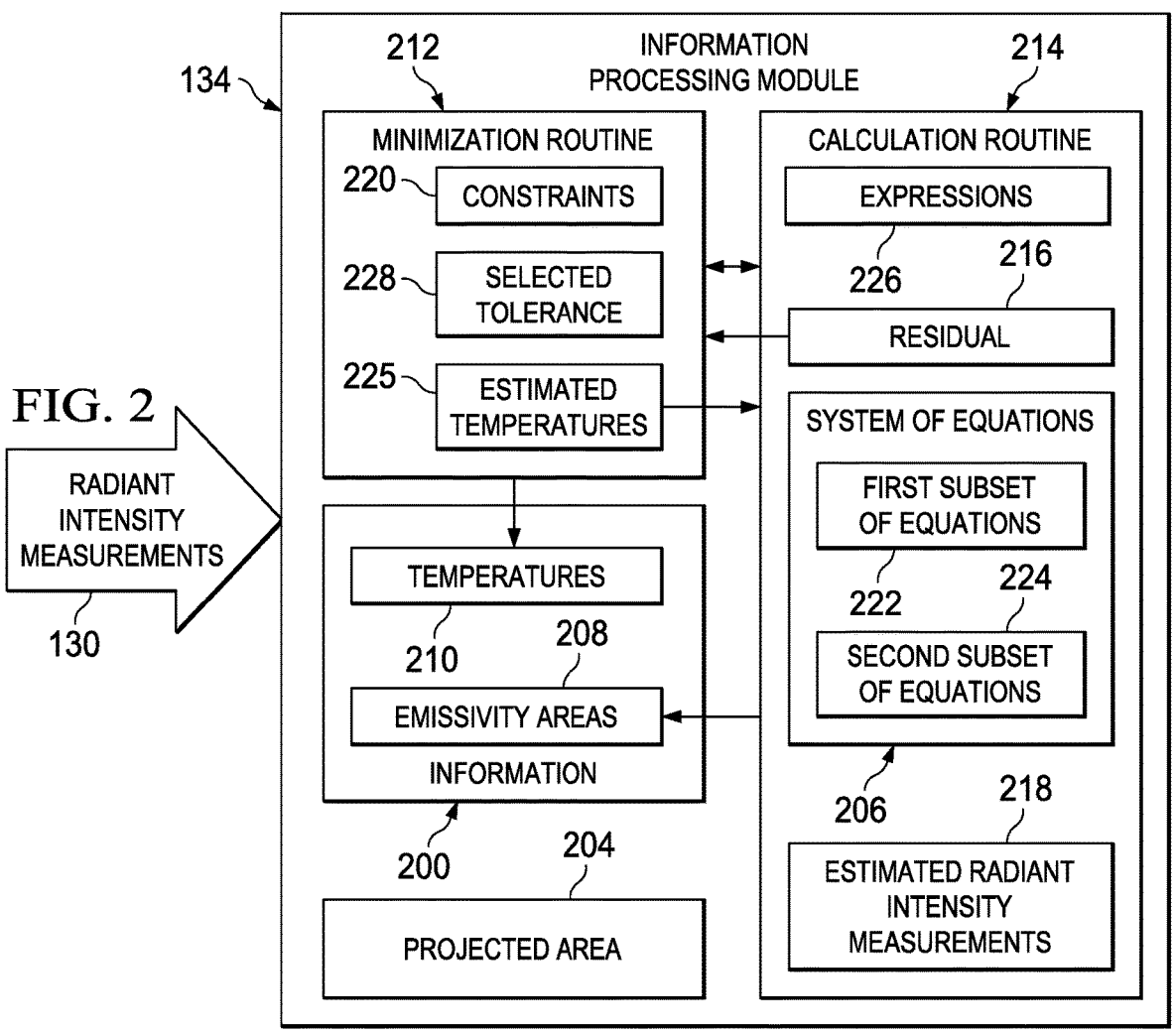
FIG. 2 is an illustration of an information processing module in accordance with an advantageous embodiment.

With reference now to FIG. 2, an illustration of an information processing module is depicted in accordance with an advantageous embodiment. In this illustrative example, information processing module 134 from FIG. 1 is described in greater detail.

As depicted, information processing module 134 is configured to receive radiant intensity measurements 130 for bands 122 from signal processing module 126 in FIG. 1. Information processing module 134 identifies information 200 about parts 132 of object 128 in FIG. 1 using radiant intensity measurements 130.

For example, information processing module 134 is configured to generate system of equations 206 that includes radiant intensity measurements 130. Information processing module 134 solves system of equations 206 to identify information 200 about parts 132 of object 128. In particular, information 200 may be used to distinguish between parts 132.

In these illustrative examples, projected area 204 for object 128 is a two-dimensional area measurement of a three-dimensional object that may be defined by projecting the shape of the object onto an arbitrary plane. In particular, projected area 204 for object 128 is the two-dimensional area measurement of object 128 from the viewpoint of sensor system 102 in FIG. 1.

The radiant intensity of object 128 is defined by the following equation:

$$J_n = \varepsilon \cdot \alpha \cdot B_n(T) \quad (1)$$

where n is a particular band in bands 122, $J_n$ is the total radiant intensity in the particular band n, $\varepsilon$ is the emissivity of object 128, $\alpha$ is projected area 204 of object 128, T is temperature, and $B_n(T)$ is the Planck black body function integrated over the particular band n at the temperature T. $B_n(T)$ is commonly referred to as a band integrated Planck black body function. In these illustrative examples, the total radiant intensity, $J_n$, is in units of Watts per steradian (W/sr); the emissivity, $\varepsilon$, has a value between 0 and 1 without any dimensions; projected area 204, $\alpha$, is in units of centimeters squared (cm$^2$); the Planck black body function has units of Watts per centimeters squared steradian (W/(cm$^2$ steradian); and the temperature, T, is in kelvins (K). In other illustrative examples, other units may be used for these parameters.

The Planck black body function integrated over the particular band n at the temperature $T_m$ is defined by the following equation:

$$B_n = \int_{\lambda_{n1}}^{\lambda_{n2}} \frac{c_1}{\pi} \frac{1}{x^5 \left( e^{\frac{c_2}{xT_m}} - 1 \right)} dx \quad (2)$$

where $c_1$ is a first radiation constant that is about 3.741310 e$^{-12}$ Watts centimeters squared (Wcm$^2$), $c_2$ is a second radiation constant that is about 1.4388 centimeters Kelvin (cmK), $\lambda_{n1}$ is a lower wavelength limit for the particular band n, $\lambda_{n2}$ is an upper wavelength limit for the particular band n, and m is a particular part in parts 132.

Further, the notation of $\varepsilon \cdot \alpha$ may be simplified based on an assumption that the emissivity, $\varepsilon$, for a part is substantially constant independent of wavelength across bands 122 of FIG. 1. For example, the notation of $\varepsilon \cdot \alpha$ may be simplified as follows:

$$A = \varepsilon \cdot \alpha, \text{ so that} \quad (3)$$

$$J_n = A \cdot B_n(T), \quad (4)$$

where A is an emissivity area.

In particular, the radiant intensity for a particular band n may be given by the following equation:

$$J_n = A_1 B_{n1} + A_2 B_{n2} + \ldots A_M B_{nM}, \text{ or} \quad (5)$$

$$J_n = \sum_{m=1}^{M} A_m B_{nm}, \text{ where} \quad (6)$$

$$B_{nm} = B_n(T_m) \quad (7)$$

where M is the total number of parts in parts 132, $T_m$ is the temperature of the particular part m, $A_m$ is the emissivity area of the particular part m, and $B_{nm}$ is the Planck black body function integrated over the particular band n at the temperature of the particular part m.

In these illustrative examples, information processing module 134 generates system of equations 206 using equation (5) described above. System of equations 206 is generated for all of bands 122 for which sensor data 108 was generated. System of equations 206 comprises:

$$J_1 = A_1 B_{11} + A_2 B_{12} + \ldots A_M B_{1M} \quad (8)$$
$$J_2 = A_1 B_{21} + A_2 B_{22} + \ldots A_M B_{2M}$$
$$\vdots$$
$$J_N = A_1 B_{N1} + A_2 B_{N2} + \ldots A_M B_{NM}$$

where N is the total number of bands in bands 122. In these illustrative examples, N>=2M. In other words, the total number of bands, N, in bands 122 is selected as at least twice the number of total parts, M, in parts 132.

Information processing module 134 then solves system of equations 206 to identify information 200 about parts 132 of object 128. In these illustrative examples, information 200 may include at least one of emissivity areas 208 for parts 132 and temperatures 210 for parts 132. In other words, information processing module 134 is configured to identify an emissivity area and temperature for each of parts 132 of object 128.

In particular, information processing module 134 includes minimization routine 212 and calculation routine 214. Minimization routine 212 is configured to receive radiant intensity measurements 130. Further, minimization routine 212 is configured to solve system of equations 206 by minimizing residual 216 between radiant intensity measurements 130 and estimated radiant intensity measurements 218. Estimated radiant intensity measurements 218 may be generated using calculation routine 214.

In these illustrative examples, residual 216 may represent, for example, an error between radiant intensity measurements 130 and estimated radiant intensity measurements 218. Minimization routine 212 may minimize residual 216 using currently-available minimization techniques. For example, residual 216 may be minimized using a technique based on least squares.

As depicted, residual 216 is defined by the following equation:

$$R = \sum_{n=1}^{N} (J_n - \hat{J}_n)^2 = \sum_{n=1}^{N} (A_1 B_{n1} + A_2 B_{n2} + \ldots A_M B_{nM} - \hat{J}_n)^2 \quad (9)$$

where R is residual 216 and $\hat{J}_n$ is radiant intensity measurements 130.

In one illustrative example, minimization routine 212 may minimize residual 216 using constraints 220 to solve system of equations 206 for emissivity areas 208 and temperatures 210 simultaneously. These constraints may include a constraint that all of emissivity areas 208 for parts 132 are greater than about zero and less than some selected maximum for an emissivity area. Further, constraints 220 may also include one or more constraints that limit the ranges of temperatures for temperatures 210 of parts 132.

In another illustrative example, minimization routine 212 may minimize residual 216 by dividing system of equations 206 into first subset of equations 222 and second subset of equations 224. First subset of equations 222 and second subset of equations 224 may have substantially the same number of equations. In this illustrative example, first subset of equations 222 is referred to as an area subset, while second subset of equations 224 may be referred to as a temperature subset. The following paragraphs describe this process in greater detail.

In particular, minimization routine 212 calls calculation routine 214 to perform a series of operations to identify residual 216. Additionally, minimization routine 212 sends radiant intensity measurements 130 and estimated temperatures 225 to calculation routine 214 for performing the series of operations. Estimated temperatures 225 may be estimations for temperatures 210 for parts 132 based on constraints 220. Estimated temperatures 225 may be estimated by minimization routine 212, another process in information processing module 134, and/or an operator providing estimated temperatures 225 as an input into minimization routine 212.

When called, calculation routine 214 forms system of equations 206. Calculation routine 214 then divides system of equations 206 into first subset of equations 222 and second subset of equations 224. Calculation routine 214 then uses first subset of equations 222 to solve for emissivity areas, $A_m$, as a function of radiant intensity measurements, $J_n$, and the band integrated Planck body functions, $B_{nm}$. In these illustrative examples, an assumption is made that residual 216 is minimized when the partial derivatives for residual 216 are substantially equal to zero. For example, residual 216 may have a minimum value when the partial derivatives for residual 216 with respect to the emissivity areas, $A_m$, for a particular part are substantially zero. In other words, residual 216 may have a minimum value when $$\frac{\partial R}{\partial A_m} = \frac{\partial \sum_{n=1}^{N}(A_1 B_{n1} + A_2 B_{n2} + \ldots A_M B_{nM} - \hat{J}_n)^2}{\partial A_m} = 0, \text{ or} \quad (10)$$

$$= \sum_{n=1}^{N}(A_1 B_{n1} + A_2 B_{n2} + \ldots A_M B_{nM} - \hat{J}_n)B_{nm} = 0.$$

The partial derivatives with respect to the emissivity areas, $A_m$, for all of parts 132 of object 128 may be represented in matrix form as follows:

$$\begin{pmatrix} \sum_{n=1}^{NN} B_{n1}^2 & \sum_{n=1}^{NN} B_{n2} B_{n1} & \cdots & \sum_{n=1}^{NN} B_{nM} B_{n1} \\ \sum_{n=1}^{NN} B_{n1} B_{n2} & \sum_{n=1}^{NN} B_{n2}^2 & \cdots & \sum_{n=1}^{NN} B_{nM} B_{n2} \\ \vdots & \vdots & \ddots & \vdots \\ \sum_{n=1}^{NN} B_{n1} B_{nM} & \sum_{n=1}^{NN} B_{n2} B_{nM} & \cdots & \sum_{n=1}^{NN} B_{nM}^2 \end{pmatrix} \begin{pmatrix} A_1 \\ A_2 \\ \vdots \\ A_M \end{pmatrix} = \begin{pmatrix} \sum_{n=1}^{NN} \hat{J}_n B_{n1} \\ \sum_{n=1}^{NN} \hat{J}_n B_{n2} \\ \vdots \\ \sum_{n=1}^{NN} \hat{J}_n B_{nM} \end{pmatrix}. \quad (11)$$

Equation (11) may be solved for emissivity areas 208, $A_m$, in terms of radiant intensity measurements and the band integrated Planck black body functions for first subset of equations 222. In particular, equation (11) may be solved to generate expressions 226 for emissivity areas 208, $A_m$. Expressions 226 for emissivity areas 208, $A_m$, define associations between radiant intensity measurements 130 and emissivity areas 208, $A_m$.

For example, when number 123 for parts 115 is two parts such that the total number of parts in parts 132 is two parts, or M=2, then expressions 226 for emissivity areas 208, $A_m$, may be defined as follows:

$$A_1 = \frac{\left(\left(\sum_{n=1}^{NN} \hat{J}_n B_{n1}\right)\sum_{n=1}^{NN} B_{n2}^2 - \left(\sum_{n=1}^{NN} \hat{J}_n B_{n2}\right)\sum_{n=1}^{NN} B_{n2} B_{n1}\right)}{\left(\left(\sum_{n=1}^{NN} B_{n2}^2\right)\sum_{n=1}^{NN} B_{n1}^2 - \left(\sum_{n=1}^{NN} B_{n2} B_{n1}\right)\sum_{n=1}^{NN} B_{n1} B_{n2}\right)}, \text{ and} \quad (12)$$

$$A_2 = \frac{\left(\left(\sum_{n=1}^{NN} \hat{J}_n B_{n2}\right)\sum_{n=1}^{NN} B_{n1}^2 - \left(\sum_{n=1}^{NN} \hat{J}_n B_{n1}\right)\sum_{n=1}^{NN} B_{n1} B_{n2}\right)}{\left(\left(\sum_{n=1}^{NN} B_{n2}^2\right)\sum_{n=1}^{NN} B_{n1}^2 - \left(\sum_{n=1}^{NN} B_{n2} B_{n1}\right)\sum_{n=1}^{NN} B_{n1} B_{n2}\right)}. \quad (13)$$

Calculation routine 214 is configured to substitute expressions 226 for emissivity areas 208, $A_m$, in second subset of equations 224 such that the equations in second subset of equations 224 are dependent only on the band integrated Planck black body functions and thereby, temperatures 210, $T_m$.

Further, calculation routine 214 then uses estimated temperatures 225 to solve second subset of equations 224 to generate estimated radiant intensity measurements 218. Calculation routine 214 then uses estimated radiant intensity measurements 218 and radiant intensity measurements 130 to form residual 216 according to equation (9). Calculation routine 214 sends residual 216 to minimization routine 212.

Minimization routine 212 determines whether residual 216 between estimated radiant intensity measurements 218 and radiant intensity measurements 130 is within selected tolerance 228. When residual 216 is not within selected tolerance 228, minimization routine 212 may modify estimated temperatures 225 while using constraints 220. Minimization routine 212 may then send these modified estimated temperatures to calculation routine 214 and call on calculation routine 214 to generate new estimated radiant intensity measurements.

When residual 216 is within selected tolerance 228, estimated temperatures 225 that resulted in residual 216 within selected tolerance 228 are identified as temperatures 210 for parts 132 for object 128. Once temperatures 210 are identified, calculation routine 214 evaluates first subset of equations 222 for emissivity areas 208 using temperatures 210 that were identified as estimated temperatures 225 that resulted in residual 216 within selected tolerance 228 and radiant intensity measurements 130.

In this manner, information processing module 134 is configured to identify emissivity areas 208 and temperatures 210 for parts 132 of object 128. Emissivity areas 208 and temperatures 210 are different for the different parts in parts 132. As a result, the different parts in parts 132 for object 128 may be distinguished using emissivity areas 208 and temperatures 210.

In particular, the values for emissivity areas 208 and temperatures 210 may be compared to the values identified for emissivity areas 119 and temperatures 121, respectively, for parts 115 of object of interest 113 in FIG. 1. If the values for emissivity areas 208 and temperatures 210 are within selected tolerances of the values identified for emissivity areas 119 and temperatures 121, respectively, for parts 115 of object of interest 113, object 128 may be identified as object of interest 113.

The illustrations of object detection environment 100 in FIG. 1 and information processing module 134 in FIG. 2 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, minimization routine 212 and calculation routine 214 may be part of the same process within information processing module 134. In other illustrative examples, information processing module 134 may be implemented within signal processing module 126.

Figure 3:
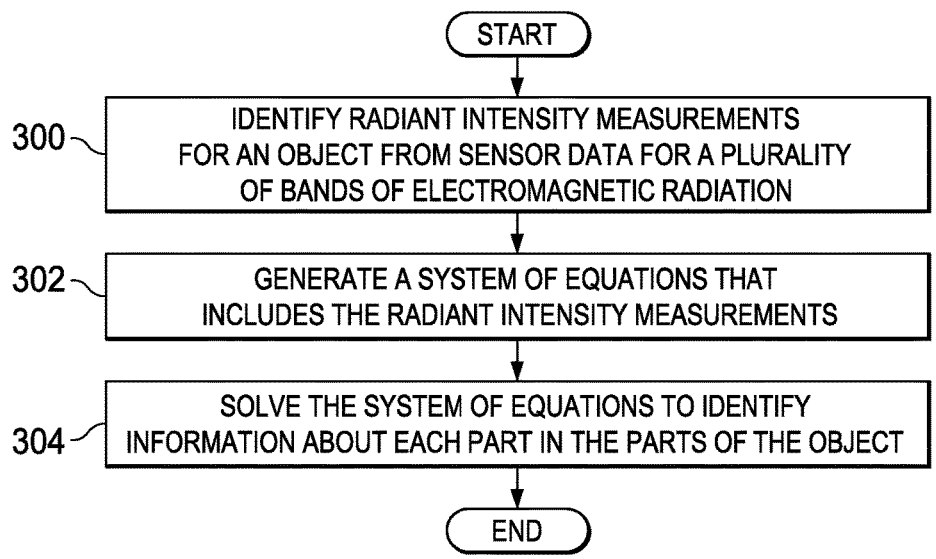
FIG. 3 is an illustration of a flowchart of a process for identifying information about objects in accordance with an advantageous embodiment.

With reference now to FIG. 3, an illustration of a flowchart of a process for identifying information about objects is depicted in accordance with an advantageous embodiment. The process illustrated in FIG. 3 may be implemented using computer system 104 in FIG. 1.

The process begins by identifying radiant intensity measurements for an object from sensor data for a plurality of bands of electromagnetic radiation (operation 300). The object has parts. In these illustrative examples, an assumption may be made that each of the parts for the object has an emissivity area and temperature that is different from the emissivity areas and temperatures of the other parts of the object.

The process then generates a system of equations that includes the radiant intensity measurements (operation 302). This system of equations may also include emissivity areas and temperatures for the parts of the object. The process then solves the system of equations to identify information about each part in the parts of the object (operation 304), with the process terminating thereafter. In operation 304, the information identified comprises an emissivity area and a temperature for each part.

Figure 4:
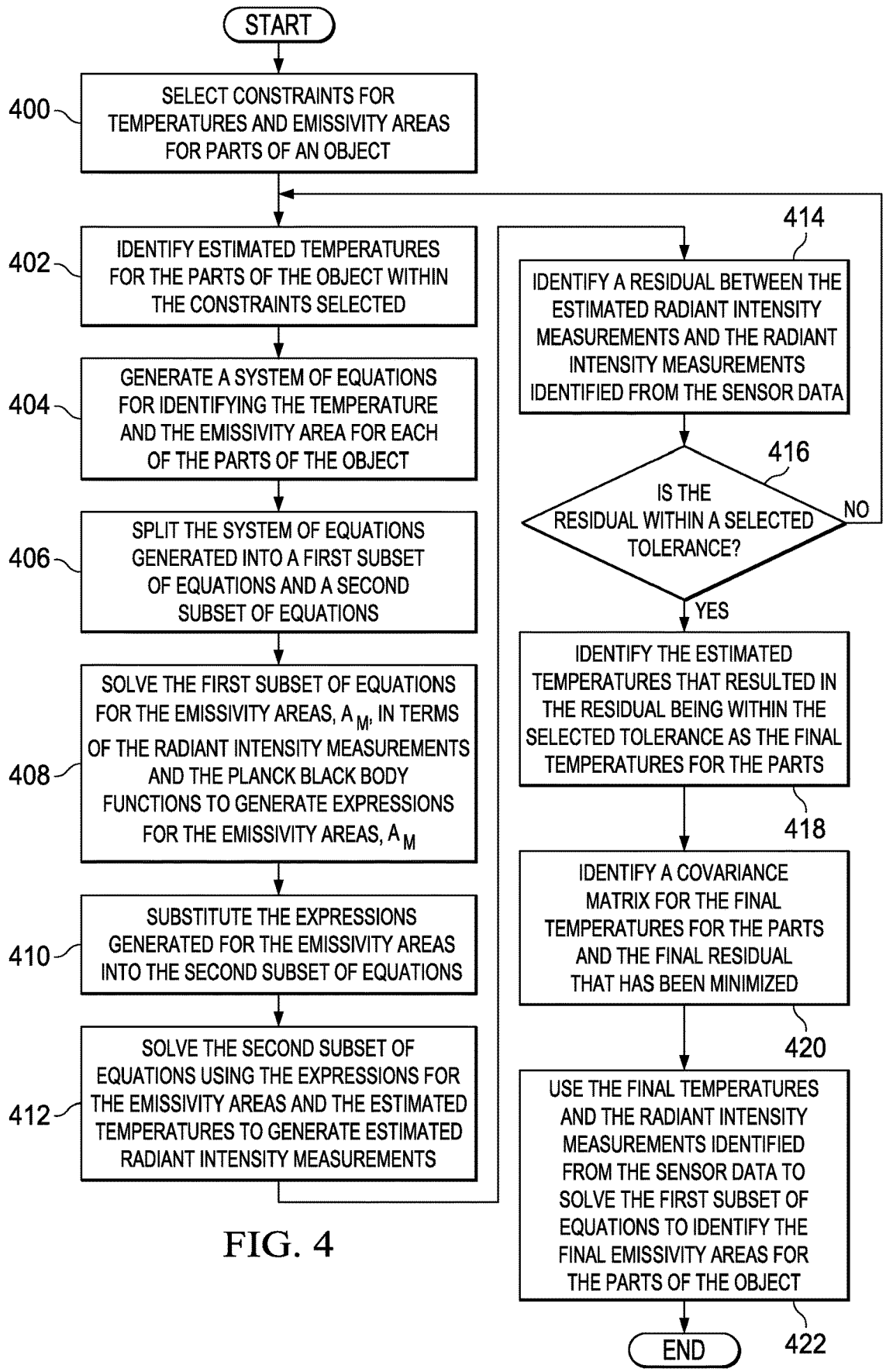
FIG. 4 is an illustration of a flowchart of a process for identifying information about objects in accordance with an advantageous embodiment.

With reference now to FIG. 4, an illustration of a flowchart of a process for identifying information about objects is depicted in accordance with an advantageous embodiment. The process illustrated in FIG. 4 may be implemented using computer system 104 in FIG. 1. In particular, the process may be implemented using minimization routine 212 and calculation routine 214 in information processing module 134 in FIG. 2.

The process begins by selecting constraints for temperatures and emissivity areas for parts of an object (operation 400). The object may be an object identified from sensor data generated by, for example, hyperspectral sensor system 114 in FIG. 1. The sensor data is generated for selected bands of electromagnetic radiation.

Next, the process identifies estimated temperatures for the parts of the object within the constraints selected (operation 402). Thereafter, the process generates a system of equations for identifying the temperature and the emissivity area for each of the parts of the object (operation 404). This system of equations may be, for example, system of equations 206 in FIG. 2 as represented in equation (8).

Each equation in the system of equations defines a radiant intensity measurement for a particular band for which the sensor data was generated using emissivity areas and the band integrated Plank black body functions for each of the parts of the objects. As described earlier, the band integrated Planck black body function for a part is dependent on the temperature for the part.

The process then splits the system of equations generated into a first subset of equations and a second subset of equations (operation 406). In one illustrative example, the first subset of equations may include the equations for the odd-numbered bands, while the second subset of equations may include the equations for the even-numbered bands when the bands are arranged in an order of ascending or descending wavelength.

Next, the process solves the first subset of equations for the emissivity areas, $A_m$, in terms of the radiant intensity measurements and the band integrated Planck black body functions to generate expressions for the emissivity areas, $A_m$ (operation 408). In other words, in operation 408, the process generates associations between the radiant intensity measurements and the emissivity areas, $A_m$, for the parts. Thereafter, the process substitutes the expressions generated for the emissivity areas into the second subset of equations (operation 410).

The process solves the second subset of equations using the expressions for the emissivity areas and the estimated temperatures to generate estimated radiant intensity measurements (operation 412). In operation 412, the second subset of equations may be solved by calculating the band integrated Planck black body functions for the parts using the estimated temperatures for the parts.

The process then identifies a residual between the estimated radiant intensity measurements and the radiant intensity measurements identified from the sensor data (operation 414). In operation 414, the residual is defined by equation (9). Next, the process determines whether the residual is within a selected tolerance (operation 416).

If the residual is within the selected tolerance, the process identifies the estimated temperatures that resulted in the residual being within the selected tolerance as the final temperatures for the parts (operation 418). The process also identifies a covariance matrix for the final temperatures for the parts and the final residual that has been minimized (operation 420). The covariance matrix may be used to generate standard errors of the final temperatures identified and a correlation matrix that indicates the degree of dependence of each of the final temperatures upon the other final temperatures. In other words, the correlation matrix indicates the correlation among the final temperatures.

The process then uses the final temperatures and the radiant intensity measurements identified from the sensor data to solve the first subset of equations to identify the final emissivity areas for the parts of the object (operation 422), with the process terminating thereafter. In this manner, the process identifies the final temperatures and the final emissivity areas for the parts of the object.

With reference again to operation 416, if the residual is not within the selected tolerance, the process returns to operation 402 as described above. In other words, the process selects new estimated temperatures that are within the selected constraints. The process described may iterate until the residual identified in operation 414 is determined to be within the selected tolerance in operation 416.

In this illustrative example, on the first iteration of operation 402, the initial estimated temperatures may be provided. For example, the initial estimated temperatures may be provided by minimization routine 212, another process in information processing module 134, and/or user input. On subsequent iterations of operation 402, the new estimated temperatures may be identified by modifying the initial temperatures in a manner such that the residual between the estimated radiant intensity measurements and the radiant intensity measurements is reduced.

Figure 5:
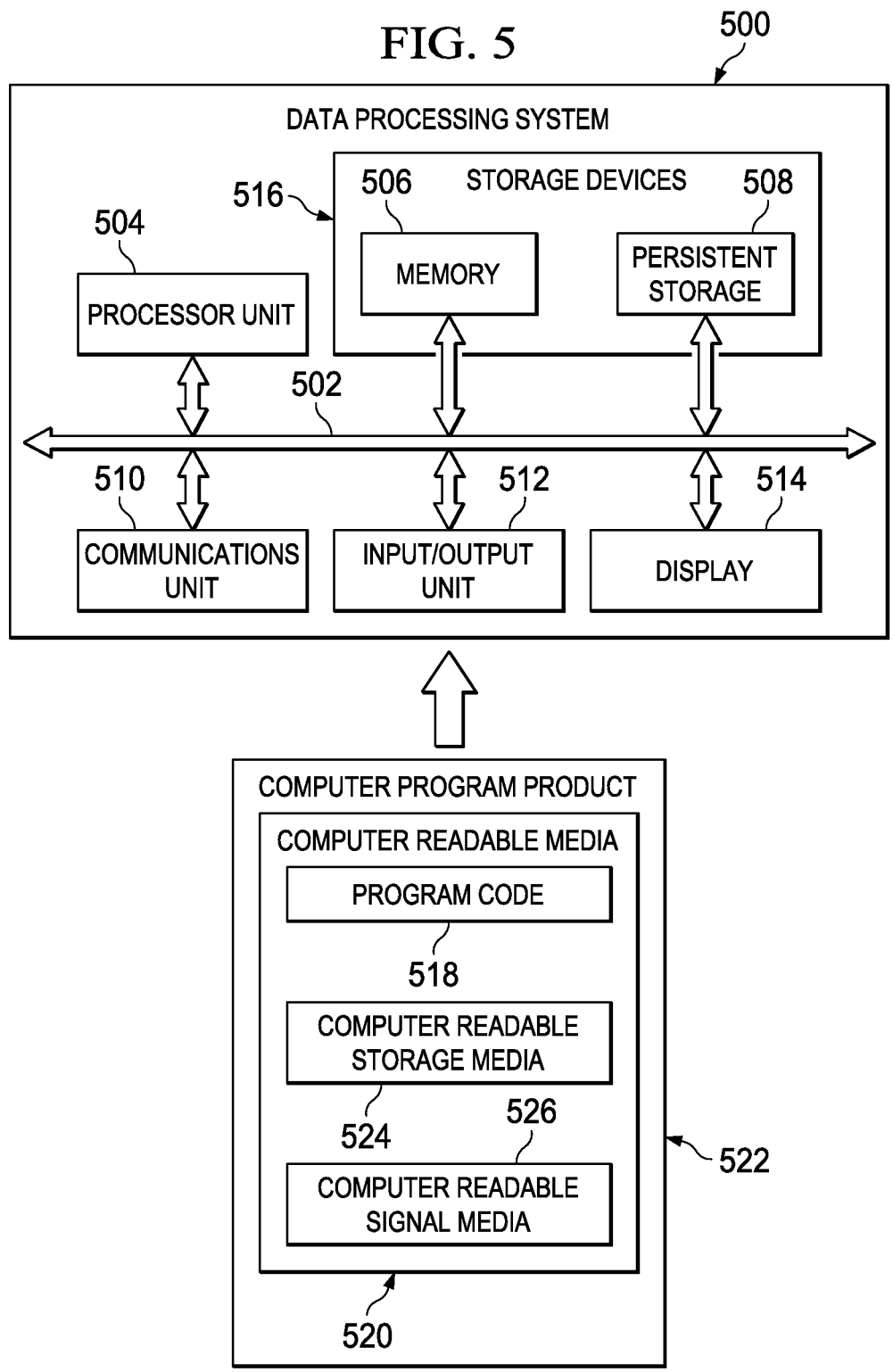
FIG. 5 is an illustration of a data processing system in accordance with an advantageous embodiment.

Turning now to FIG. 5, an illustration of a data processing system is depicted in accordance with an advantageous embodiment. In this illustrative example, data processing system 500 may be used to implement one or more of number of computers 124 in computer system 104 in FIG. 1.

As depicted, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 506, or a cache, such as found in an interface and memory controller hub that may be present in communications fabric 502.

Thus, the different advantageous embodiments provide a method and apparatus for identifying information about objects. In one advantageous embodiment, radiant intensity measurements for an object are identified from sensor data for a plurality of bands of electromagnetic radiation. The object has parts. A system of equations that includes the radiant intensity measurements are generated. The system of equations is solved to identify information about a part in the parts of the object.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for overcoming a spatial resolution limitation of a sensor system and thereby identifying information, unresolvable by the sensor system operating without the method, about parts of an object, the method comprising:

receiving, in an infrared radiometry sensor system-comprising a spatial resolution capacity insufficient for directly differentiating a value for a characteristic of a first part of the object from a value for the characteristic in a second part of the object, a plurality of bands of an electromagnetic radiation from the object;

assuming the object comprises a number of parts, and that each part of the number of parts of the object projects, respectively, information to the infrared radiometry sensor system, the information being unique to each part of the object and remaining constant during a time of measurement of the electromagnetic radiation from the object;

identifying, using: the electromagnetic radiation, an emissivity relative to a black body for the object, and a signal processor specially programmed to derive a radiant intensity from received electromagnetic radiation, a radiant intensity, respectively of at least twice as many as the number of parts, for each band from the plurality of bands;

selecting constraints comprising a maximum emissivity area and a temperature range limitation, respectively, for each part in the number of parts;

identifying, using at least: the radiant intensity for each band, the maximum emissivity area for each part in the number of parts, the temperature range limitation and an estimated temperature for each part in the number of parts, an estimated radiant intensity of each part in the number of parts, and an information processor specially programmed to derive an emissivity area and a temperature for each part in the number of parts via minimizing a residual between the radiant intensity for each band and an estimated radiant intensity for each band, the temperature, respectively, for each part in the number of parts; and identifying, using at least: the radiant intensity for each band, the maximum emissivity area for each part, the temperature, respectively, for each part in the number of parts, and the information processor specially programmed to derive the emissivity area and the temperature for each part in the number of parts, the emissivity area, respectively, for each part in the number of parts.

2. The method of claim 1 further comprising:

each band in the plurality of bands comprising a unique range of wavelengths of the electromagnetic radiation;

an emissivity of each part of the object remains substantially constant independent of wavelength across plurality of bands; and the radiant intensity being a measurement of Watts per steradian.

3. The method of claim 2, wherein the infrared radiometry sensor system comprises a hyperspectral sensor system and wherein measurements of the electromagnetic radiation emitted by the object comprises power measured per unit solid angle in a direction of the infrared radiometry sensor system.

4. The method of claim 1, further comprising, the plurality of bands being at least twice a total number of the parts of the object.

5. The method of claim 1, further comprising integrating a Planck black body function for each part in the number of parts over each band, respectively, at a temperature unique to the each part, wherein each equation in a system of equations defines a radiant intensity measurement for a band in the plurality of bands using the emissivity area for the each part in the parts of the object and a Planck black body function for the each part in the parts.

6. The method of claim 5, wherein the step of solving the system of equations to identify the information about the each part in the number of parts of the object comprises:
estimating temperatures for the parts in the number of parts of the object to form estimated temperatures.

7. The method of claim 6, wherein the step of solving the system of equations to identify the information about the each part in the number of parts of the object further comprises:
splitting the system of equations into a first subset of equations and a second subset of equations.

8. The method of claim 7, wherein the step of solving the system of equations to identify the information about the each part in the number of parts of the object further comprises:
solving band integrated Planck black body functions for the number of parts using the estimated temperatures to generate results;
solving for emissivity areas in the first subset of equations using the results;
solving the second subset of equations using the emissivity areas and the estimated temperatures to identify estimated radiant intensity measurements for the plurality of bands;
minimizing the residual between radiant intensity measurements and the estimated radiant intensity measurements to solve the system of equations to identify final emissivity areas and final temperatures for the number of parts of the object; and
identifying a covariance matrix for the final temperatures for the number of parts of the object and generating a correlation matrix that indicates a correlation among the final temperatures.

9. The method of claim 5, wherein the system of equations comprises:

$$J_1 = A_1 B_{11} + A_2 B_{12} + \ldots A_M B_{1M}$$
$$J_2 = A_1 B_{21} + A_2 B_{22} + \ldots A_M B_{2M}$$
$$M$$
$$J_N = A_1 B_{N1} + A_2 B_{N2} + \ldots A_M B_{NM}$$

where J is a radiant intensity measurement; A is an emissivity area for a part; B is a band integrated Planck black body function integrated over a particular band at a temperature for the part; N is a total number of the plurality of bands; and M is a total number of the number of parts of the object.

10. The method of claim 8, wherein the residual is defined as follows:

$$R = \sum_{n=1}^{N} (J_n - \hat{J}_n)^2 = \sum_{n=1}^{N} (A_1 B_{n1} + A_2 B_{n2} + \ldots A_M B_{nM} - \hat{J}_n)^2$$

where R is the residual, J is the radiant intensity measurement, $\hat{J}$ is an estimated radiant intensity measurement, n is a particular band in the plurality of bands, m is a particular part in the number of parts of the object, A is an emissivity area for the particular part; B is a band integrated Planck black body function integrated over the particular band at the temperature for the particular part; N is a total number of the plurality of bands; M is a total number of the number of parts of the object.

11. A method for identifying whether an object in an image comprising a spatial resolution limitation comprises an object of interest via determining characteristics of the object, the method comprising:
receiving, in an infrared radiometry sensor system unable to provide sensor data with a spatial resolution determinative for identifying whether parts of the object comprise values for characteristics substantially similar to values for characteristics of parts of the object of interest, a plurality of bands of an electromagnetic radiation from the object;
assuming that the object and the object of interest equally comprise a number of parts and that each part, in the number of parts, respectively, projects a unique temperature and emissivity area to the infrared radiometry sensor system, such that the unique temperature and the emissivity area for each part remain constant during a time of measurement;
identifying, using: the electromagnetic radiation, an emissivity relative to a black body for the object, and a signal processor specially programmed to derive a radiant intensity from received electromagnetic radiation, a radiant intensity, respectively of at least twice as many as the number of parts, for each band from the plurality of bands;
selecting, constraints comprising a maximum emissivity area and a temperature range limitation, respectively, for each part in the number of parts;
identifying, using at least: the radiant intensity for each band, the maximum emissivity area for each part in the number of parts, the temperature range limitation and an estimated temperature for each part in the number of parts, an estimated radiant intensity of each part in the number of parts, and an information processor specially programmed to derive an emissivity area and a temperature for each part in the number of parts via minimizing a residual between the radiant intensity for each band and an estimated radiant intensity for each band, the temperature, respectively, for each part in the number of parts;
identifying, using at least: the radiant intensity for each band, the maximum emissivity area for each part, the temperature, respectively, for each part in the number of parts, and the information processor specially programmed to derive the emissivity area and the temperature for each part in the number of parts, the emissivity area, respectively, for each part in the number of parts; and
determining, using selected tolerances and the information processor, if the unique temperature and the emissivity area for each part of the object align with and thereby identify the object as being the object of interest.

12. A method for overcoming spatial resolution limitations, precluding directly identifying parts of an object, in a sensor system and thereby identifying information about the object, the method comprising:

receiving, in a hyperspectral sensor system comprising a spatial resolution capacity insufficient for directly differentiating a value for a characteristic of a first part of the object from a value for the characteristic in a second part of the object a plurality of bands of an electromagnetic radiation;

assuming the object comprises a number of parts, and that each part of the number of parts projects, respectively, information to the hyperspectral sensor system, the information being unique to each part and remaining constant during a time of measurement of the electromagnetic radiation form the object;

identifying, using: the electromagnetic radiation, an emissivity relative to a black body for the object, and a signal processor specially programmed to derive a radiant intensity from received electromagnetic radiation, a radiant intensity, respectively of at least twice as many as the number of parts, for each band from the plurality of bands of the electromagnetic radiation;

selecting constraints comprising a maximum emissivity area and a temperature range limitation, respectively, for each part in the number of parts;

identifying, using at least: the radiant intensity for each band, the maximum emissivity area for each part in the number of parts, the temperature range limitation and an estimated temperature for each part in the number of parts, an estimated radiant intensity of each part in the number of parts, and an information processor specially programmed to derive an emissivity area and a temperature for each part in the number of parts via minimizing a residual between the radiant intensity for each band and an estimated radiant intensity for each band, the temperature, respectively, for each part in the number of parts; and identifying, using at least: the radiant intensity for each band, the maximum emissivity area for each part, the temperature, respectively, for each part in the number of parts, and the information processor specially programmed to derive the emissivity area and the temperature for each part in the number of parts, the emissivity area, respectively, for each part in the number of parts of the object.

13. The method of claim 12, wherein the information about the each part comprises a unique temperature for the each part and the emissivity area for the each part; and a system of equations defining a radiant intensity measurement for a band comprises:

$$J_1 = A_1 B_{11} + A_2 B_{12} + \ldots A_M B_{1M}$$
$$J_2 = A_1 B_{21} + A_2 B_{22} + \ldots A_M B_{2M}$$
$$M$$
$$J_N = A_1 B_{N1} + A_2 B_{N2} + \ldots A_M B_{NM}$$

where J is the radiant intensity measurement; A is the emissivity area for the part; B is a band integrated Planck black body function integrated over a particular band at the temperature for the part; N is a total number of the plurality of bands; and M is a total number of the parts of the object.

14. An apparatus comprising:

an infrared radiometry sensor system comprising:
  a measurement device configured to receive and measure a plurality of bands of electromagnetic radiation from an object; and
  a spatial resolution limitation that precludes a direct resolution of the object into a number of parts; and a computer system specially programmed to:
  identify, based upon: the electromagnetic radiation, an emissivity relative to a black body for the object, and a signal processor specially programmed to derive a radiant intensity from received electromagnetic radiation, a radiant intensity, respectively of at least twice as many as the number of parts, for each band from the plurality of bands;
  assume the object comprises a number of parts, and that each part of the number of parts of the object projects, respectively, information to the infrared radiometry sensor system, the information for each part being unique and constant during a time of measurement of the electromagnetic radiation from the object;
  select, constraints that comprise a maximum emissivity area and a temperature range limitation, respectively, for each part in the number of parts;
  identify, based upon at least: the electromagnetic radiation, the emissivity relative to the black body for the object, and the signal processor specially programmed to derive a radiant intensity from received electromagnetic radiation, a radiant intensity, respectively of at least twice as many as the number of parts, for each band from the plurality of bands;
  identify, based upon at least: the radiant intensity for each band, the maximum emissivity area for each part in the number of parts, the temperature range limitation and an estimated temperature for each part in the number of parts, an estimated radiant intensity of each part in the number of parts, and an information processor specially programmed to derive an emissivity area and a temperature for each part in the number of parts via minimizing a residual between the radiant intensity for each-band and an estimated radiant intensity for each band, the temperature, respectively, for each part in the number of parts; and
  identify, based upon at least: the radiant intensity for each band, the maximum emissivity area for each part, the temperature, respectively, for each part in the number of parts, and the information processor specially programmed to derive the emissivity area and the temperature for each part in the number of parts, the emissivity area, respectively, for each part in the number of parts of the object.

15. The apparatus of claim 14, wherein the computer system receives sensor data for the plurality of bands from the infrared radiometry sensor system.

16. The apparatus of claim 15, wherein the sensor data comprises the radiant intensity for the plurality of bands.

17. The apparatus of claim 15, further comprising:
the infrared radiometry sensor system configured to generate the sensor data, such that, in operation, the sensor system generates the sensor data.

18. The apparatus of claim 14, wherein each equation in a system of equations defines the radiant intensity for a particular band in the plurality of bands using an emissivity area for the each part in the number of parts of the object and a Planck black body function for the each part in the number of parts of the object, wherein the Planck black body function for a part in the number of parts is integrated over the particular at a temperature for the part.

* * * * *